United States Patent
Mullis, II et al.

(10) Patent No.: US 7,873,841 B2
(45) Date of Patent: Jan. 18, 2011

(54) METHOD OF MAINTAINING A USB ACTIVE STATE WITHOUT DATA TRANSFER

(75) Inventors: Samuel L. Mullis, II, Raleigh, NC (US); Mark Steven Frisbee, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 844 days.

(21) Appl. No.: 11/554,247

(22) Filed: Oct. 30, 2006

(65) Prior Publication Data

US 2008/0104422 A1    May 1, 2008

(51) Int. Cl.
*G06F 1/26* (2006.01)
(52) U.S. Cl. .................. 713/300; 713/310; 713/320; 713/321; 713/322; 713/323; 713/324; 713/330; 713/340
(58) Field of Classification Search .......... 713/300, 713/310, 320–324, 330, 340
See application file for complete search history.

(56) References Cited

U.S. PATENT DOCUMENTS

| | | | | |
|---|---|---|---|---|
| 5,914,877 | A * | 6/1999 | Gulick | 700/94 |
| 6,230,277 | B1 | 5/2001 | Nakaoka et al. | |
| 6,460,143 | B1 * | 10/2002 | Howard et al. | 713/323 |
| 6,665,801 | B1 * | 12/2003 | Weiss | 713/300 |
| 7,036,031 | B2 * | 4/2006 | Takeuchi | 713/323 |
| 7,149,906 | B2 * | 12/2006 | Sakai | 713/300 |
| 7,325,733 | B2 * | 2/2008 | Wurzburg et al. | 235/441 |
| 7,415,626 | B2 * | 8/2008 | Lilja et al. | 713/500 |
| 2001/0003166 | A1 * | 6/2001 | Gulick | 700/94 |
| 2005/0158065 | A1 * | 7/2005 | Matsuda | 399/66 |
| 2006/0287007 | A1 * | 12/2006 | Veselic et al. | 455/572 |
| 2007/0005824 | A1 * | 1/2007 | Howard | 710/18 |

OTHER PUBLICATIONS

"Universal Serial Bus Specification—Revision 2.0." Universal Serial Bus Specification. Apr. 27, 200. pp. 118-170. XP-002169502. USB-Implementers Forum Inc. Copyright © 2000, Compaq, Hewlett-Packard, Intel, Lucent, Microsoft, NEC, Philips.
"International Search Report," International Application No. PCT/US2007/074468, May 29, 2008, European Patent Office, Rijswiijk, Netherlands.

* cited by examiner

*Primary Examiner*—Abdelmoniem Elamin
(74) *Attorney, Agent, or Firm*—Coats & Bennett, P.L.L.C.

(57) ABSTRACT

A USB bus-powered device in Suspend state that requires active bus state power levels, but has no data transfer need, may initiate Resume signaling to return a USB bus segment to active state, without transferring any data across the bus. A device driver considers both USB device power needs and data transfer activity in deciding to Globally or Selectively Suspend a bus or bus segment. In particular, upon deciding to Suspend a bonus or bus segment, the device driver queries a USB bus-powered device. If the device will require active bus mode power within a predetermined duration, the device will indicate to the device driver to remain an active mode. In this case, the device driver does not direct the USB host to Suspend the bus.

15 Claims, 3 Drawing Sheets

METHOD OF MAINTAINING A USB ACTIVE STATE WITHOUT DATA TRANSFER

BACKGROUND

The present invention relates generally to the Universal Serial Bus (USB) and in particular to a method of maintaining an active USB state without data transfer.

The USB is a highly popular, industry standard, serial bus that provides data communications between, e.g., a data processing system, and a wide variety of peripheral devices, including user interface equipment (keyboard, mouse, joystick, touchpad, and the like), printers, scanners, data storage devices, digital cameras, video game controllers, and many others. Indeed, only monitors and video equipment, or similar devices with very high data transfer bandwidth needs, cannot be adequately served by the 480 Mb/s maximum transfer speed of version 2.0 of the USB. The USB is a very user-friendly bus. Up to 127 devices may connect to a USB port, including hubs of additional ports, to create a tree structure. The bus is "hot pluggable," and is "plug and play" for most devices, with an enumeration protocol and standardized device classes, allowing the USB host to recognize, and generic device drivers to control, most USB devices.

Equally important for several classes of devices is that the USB bus provides power at a nominal 5 V and up to 500 mA, allowing devices to be bus-powered. This obviates the need for a low-power device to include batteries or an external source of power. Portable flash memory data storage devices—variously known as flash drives, thumb drives, pen drives, and the like—are perhaps the best-known examples of USB bus-powered devices, although a broad variety of other bus-powered devices are known in the art, including reading lights, fans, and even coffee warmers.

The USB specification defines a Suspend state, during which a USB device may draw no more than 2.5 mA (including required pull up resistors), averaged over a 1.0 second interval. A USB device should automatically enter Suspend state if no upstream data transfer activity (an Idle state) persists on the bus for 3 msec. To prevent devices from entering Suspend state during periods of no data transfer, the USB host periodically sends a "keep alive" signal (a Start of Frame, or SOF token) on the bus. The USB host may implement a Global Suspend by ceasing all transmission on the bus (including the SOF token), allowing each device on the bus to enter Suspend state as it recognizes an Idle bus state. An individual USB bus segment may be Selectively Suspended by blocking all transmissions downstream of a USB hub port. Any non-idle signaling by a port will trigger all downstream USB devices to Resume from Suspend state, and a device with remote wakeup capability can use Resume signaling to exit a Suspend state if the device has data to send (e.g., if a mouse detects movement or a button press).

SUMMARY

According to one embodiment, a USB bus-powered device in Suspend state that requires active bus state power levels, but has no data transfer need, may initiate Resume signaling to return a USB bus segment to active state, without transferring any data across the bus. According to another embodiment, a device driver considers both USB device power needs and data transfer activity in deciding to Globally or Selectively Suspend a bus or bus segment. In particular, upon deciding to Suspend a bonus or bus segment, the device driver queries a USB bus-powered device. If the device will require active bus mode power within a predetermined duration, the device will indicate to the device driver to remain an active mode. In this case, the device driver does not direct the USB host to Suspend the bus.

In one embodiment, the present invention relates to an on-demand method of powering a USB device. A first current is supplied to a USB device attached to a USB bus segment in active mode. In response to a lack of USB data transfer activity at the USB device, the USB bus segment is placed in suspend mode and a second current lower than the first current is supplied to the USB device. In response to an indication from the USB device, the USB bus segment is restored to active mode and the first current is supplied to the USB device. The USB bus restore does not prompt a data transfer between the USB host and the USB device.

In another embodiment, the present invention relates to a USB bus-powered device. The device includes an electronic circuit and a USB interface receiving from a USB bus segment a first current sufficient to power the electronic circuit in an active mode and a second current insufficient to power the electronic circuit in a suspend mode. The device further includes a controller operative to anticipate a need to power the electronic circuit, and in response, to issue a remote wakeup procedure to transition the USB bus segment from suspend mode to active mode without transferring data across the USB bus.

In yet another embodiment, the present invention relates to a data processing system. The system includes a processor, a USB bus host controlling at least one USB bus segment, and at least one USB bus-powered device drawing current from the USB bus. The system further includes a device driver executing on the processor and operative to monitor device activity and selectively direct the USB bus host to suspend the USB bus segment, the device driver further operative to query the USB bus-powered device for power needs prior to suspending the USB bus segment.

In still another embodiment, the present invention relates to a USB device driver operative to monitor a USB bus segment for data transfer activity; determine, based on a lack of data transfer activity, to suspend the bus segment; query one or more devices attached to the bus segment whether they can enter a low power mode; and selectively suspend the bus segment or not, in response to the a device's response to the query.

DETAILED DESCRIPTION

Figure 1:
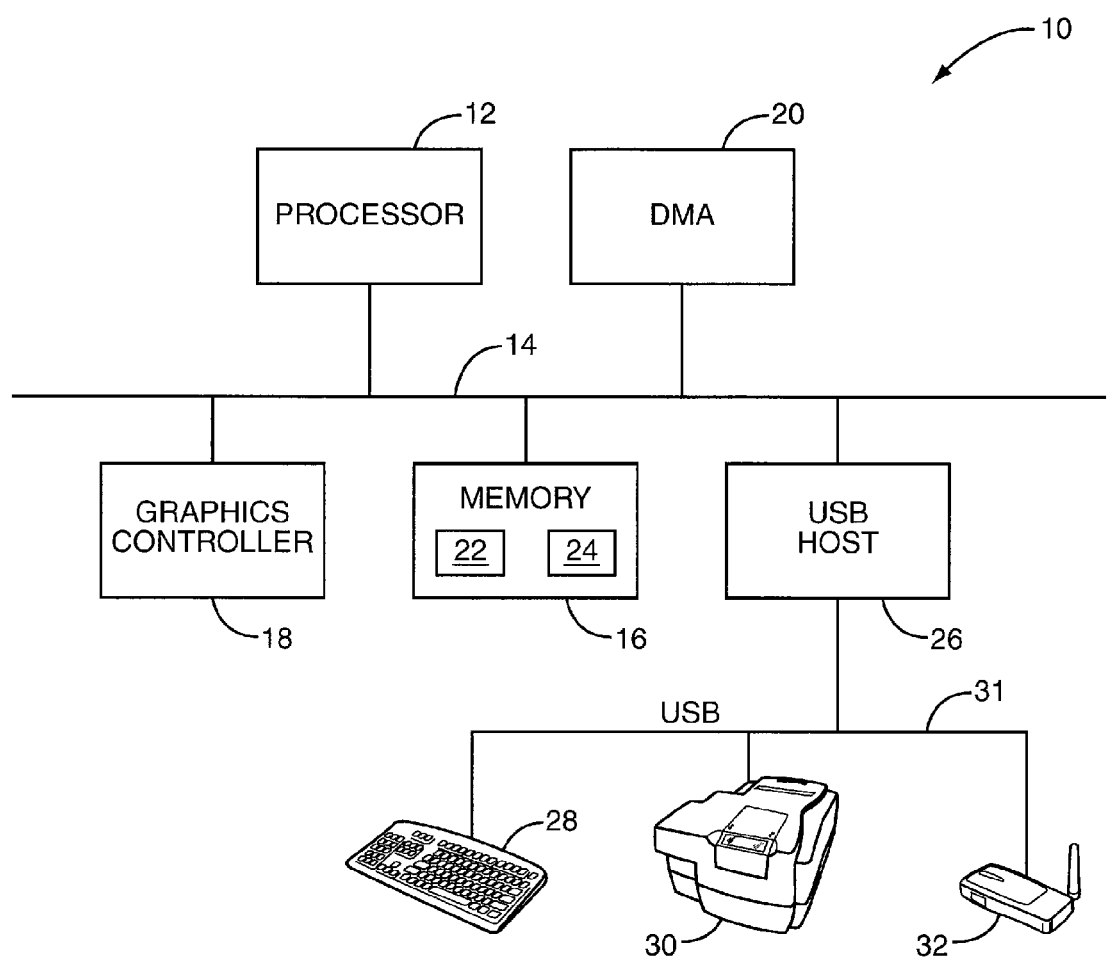
FIG. 1 is a functional block diagram of a data processing system.

FIG. 1 depicts a functional block diagram of a representative data processing system, indicated generally by the numeral 10. The system 10 includes one or more processors 12, or other controller(s) such as a Digital Signal Processor (DSP), embedded microcontroller, state machine implemented in an ASIC or FPGA, or the like. The processor 12 is connected to an internal bus 14, and transfers data across the bus to and from memory 16. Other system 10 components, such as a graphics controller 18 and DMA controller 20, may also be connected to the bus 14. Software 22, loaded into the memory 16 and executed on the processor(s) 12, may include an operating system and applications, and in one embodiment includes a USB device driver 24. The data processing system 10 may power a stationary or portable computer, Personal Digital Assistant (PDA), video game console, or any other data processing system. Those of skill in the art will appreciate that the data processing system 10 may include a broad variety of peripheral devices and circuits, and may have an architecture different than that depicted in FIG. 1. The system 10 is representative only, and is to be broadly construed.

A USB host controller 26, connected to the processor bus 14 or to a peripheral bus (not shown) provides USB functionality for data transfers to/from both internal and external peripherals, such as for example a keyboard 28 and printer 30, over one or more USB bus segments 31. In one embodiment, a wireless communication system mobile terminal 32 may be connected to the system 10 via the USB bus 31. In one embodiment, the mobile terminal 32 is powered by the USB bus 31.

Figure 2:
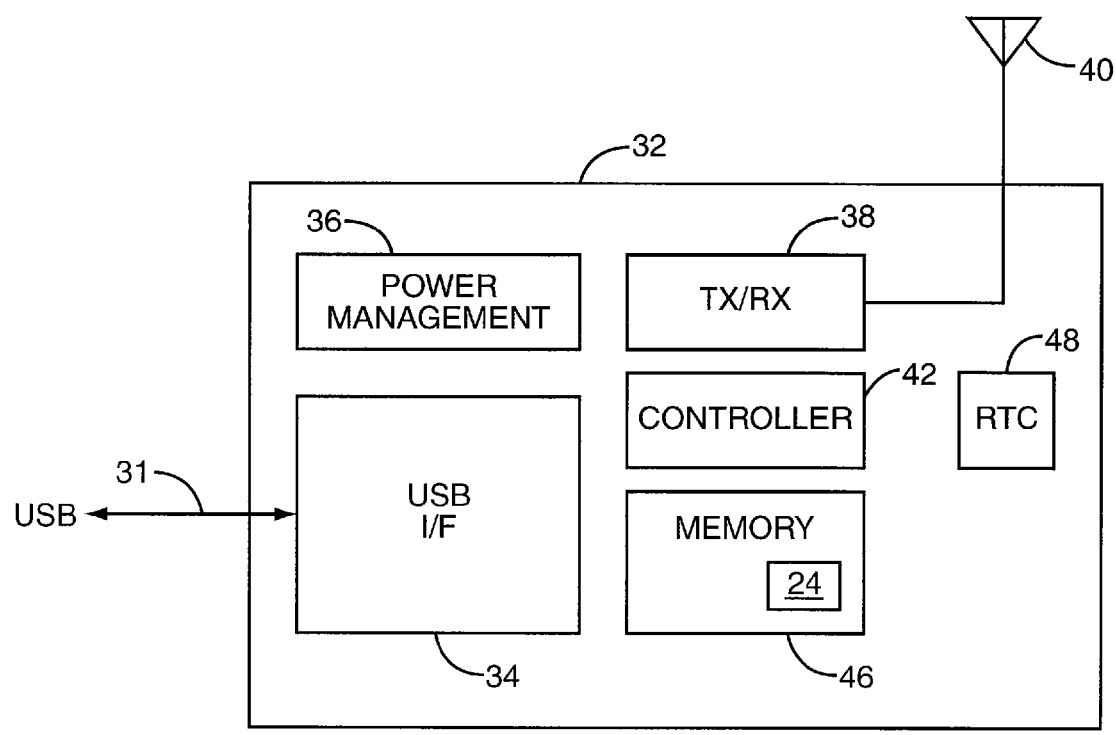
FIG. 2 is a functional block diagram of a USB bus-powered mobile terminal.

FIG. 2 depicts a functional block diagram of a USB bus-powered mobile terminal 32. The mobile terminal 32 includes a USB interface 34 and power management function 36 that selectively distributes USB-derived power to other circuits. The mobile terminal 32 includes an RF transceiver 38 connected to an internal or external antenna 40. Under the direction of a controller 42, such as a processor, the transceiver 38 implements a fully functional radiotelephone and/or modem, according to one or more industry standard wireless communication protocols, such as CDMA, cdma2000, WCDMA, 1xEvDO/DV, GSM, GPRS, EDGE, UMTS, HSDPA, HSUPA, or the like. The controller 42 executes code from memory 46, and receives timing information from a Real Time Clock (RTC) 48 or other timer. The mobile terminal 32 differs from a traditional cellular telephone primarily in its lack of user interface features such as a keyboard, microphone, display, and the like. The mobile terminal 32 relies on the data processing system 10 to provide all necessary user interface features. In one embodiment, the memory 46 stores an inventive USB device driver 24, which the mobile terminal 32 may transmit over the USB bus 31 to the operating system of a data processing system 10 to which the mobile terminal 32 is connected.

Through careful power management, high circuit integration, the use of low-voltage circuits, and other elements of state-of-the-art engineering, the mobile terminal 32 may be designed to operate entirely on the (up to) 500 mA current it receives from the USB bus 31. However, the transceiver 38 cannot operate on the maximum average 2.5 mA current to which the mobile terminal 32 is limited in Suspend state. When the mobile terminal 32 is actively receiving data from or sending data to the wireless communication system, it is likely also sending data to or receiving data from the system 10 across the USB bus 31, so an active state of the bus 31 and the availability of full power is assured. Periodically, however—such as every 1.2 or 2.5 seconds, depending on the protocol—the mobile terminal 32 must monitor one or more paging channels of the wireless communication network to discover any incoming "calls," which may comprise voice or data communications directed to the mobile terminal 32. No data transfer with the system 10 is required, or will likely occur, prior to each scheduled paging channel monitoring operation. Accordingly, if the mobile terminal 32 is in Suspend state, it does not receive sufficient power to operate the transceiver 38, to monitor the paging channel.

Entry of a USB bus or bus segment 31 into Suspend state (by halting SOF tokens and allowing devices to Suspend) is controlled by device drivers, in response to data transfer activity. Existing drivers do not consider whether a USB bus-powered device needs the higher power of an active bus state, even if the device does not engage in data transfers across the USB bus 31.

According to one embodiment of the present invention, the mobile terminal 32 (or other USB bus-powered device that needs active bus state power during times of no data transfer) performs a remote wakeup by initiating Resume signaling, as defined in section 7.1.7.7 of the USB Specification, Revision 2.0, with the exception that the mobile terminal 32 does not subsequently indicate that it has data to transfer to the USB host 26.

According to another embodiment of the present invention, a device driver 24 monitors the USB bus segments 31 for data transfer activity, but obtains "permission" from one or more USB devices, such as the mobile terminal 32, prior to directing a corresponding USB bus segment 31 to enter Suspend state. In this manner, the device driver 24 considers the power needs of the mobile terminal 32, as well as USB bus 31 activity, in determining to Selectively or Globally Suspend the bus 31.

Figure 3:
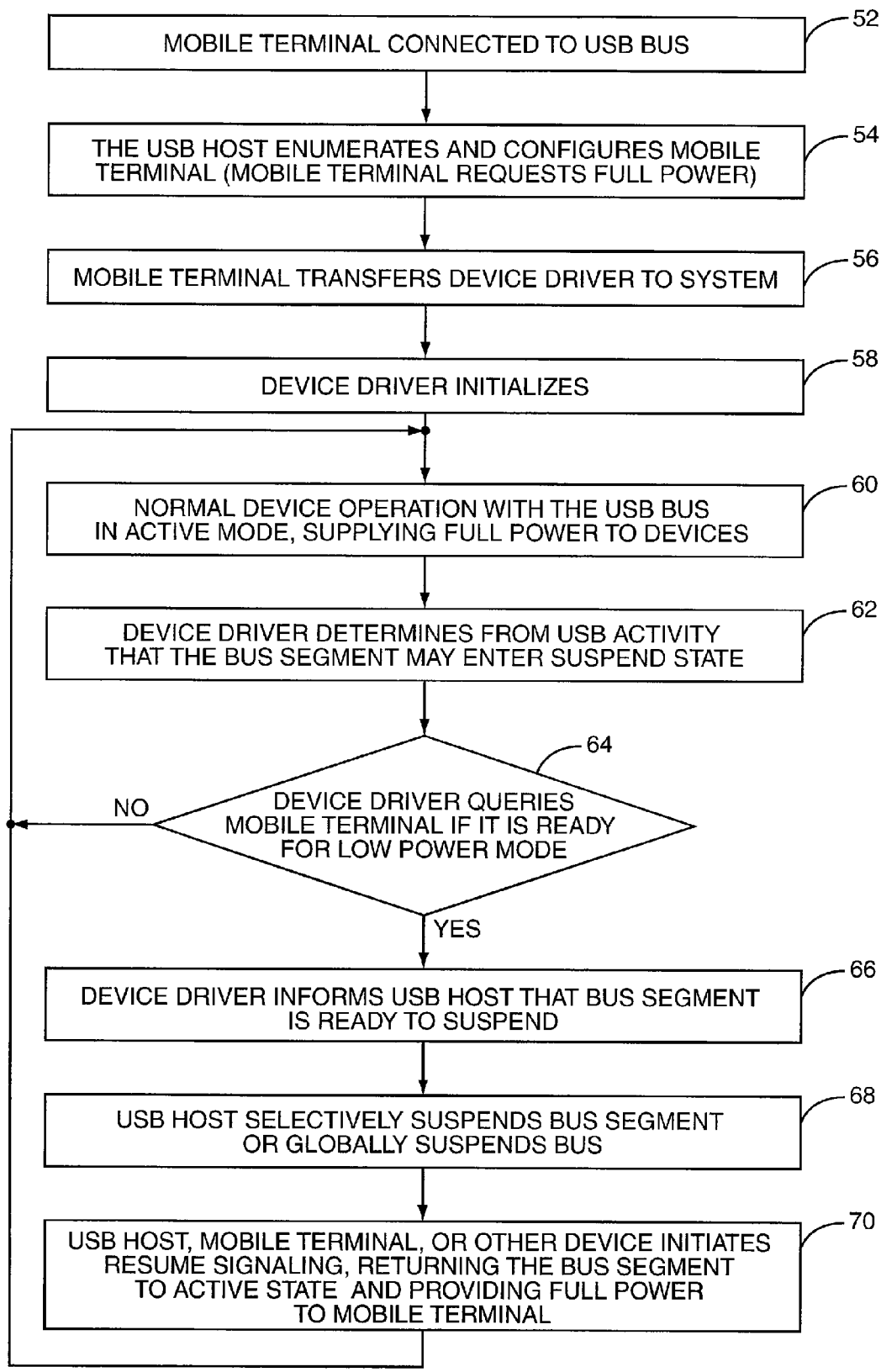
FIG. 3 is a flow diagram of a method of operating a USB bus-powered mobile terminal.

This process is depicted in flow diagram form in FIG. 3, using the mobile terminal 32 as a representative USB bus-powered device. The process begins as of the mobile terminal 32 is connected to the US the bus 31 (step 52). The USB host 26 and in rates and configures the mobile terminal 32, according to the USB Specification (block 54). During this process, the mobile terminal 32 initially requests only one unit (100 mA) of current, and subsequently requests up to five units (500 mA). The mobile terminal 32 may transfer the device driver 24 to the data processing system 10 (block 56). The device driver 24 initializes (block 58) on the system 10 processor 12, and controls data transfer to and from the mobile terminal 32. The mobile terminal 32 operates normally, with the USB bus 31 in active mode, under the control of the device driver 24. The USB bus 31 supplies up to 500 mA of current (block 60).

Based on a lack of USB bus 31 data transfer activity, the device driver 24 determines that at least the bus segment 31 to which the mobile terminal 32 is connected may enter Suspend state (block 62). However, the device driver 24 first queries the mobile terminal 32 to ascertain whether the mobile terminal 32 is ready to enter a low power mode (block 64). If the mobile terminal 32 needs high power, such as to monitor a paging channel, either immediately or within a predetermined duration, the mobile terminal 32 will respond "no." In this case, the device driver 24 will not direct the USB host 26 to Suspend the bus segment 31, but rather will continue in "normal" operation in active mode, supplying sufficient power to the mobile terminal 32 (block 60).

On the other hand, if the mobile terminal is not scheduled to require full power, such as to monitor a paging channel, in the near future (i.e., beyond a predetermined duration), the mobile terminal 32 will respond "yes" to the device driver's 24 query for a low power mode. In this case, the device driver 24 informs the USB host 26 that the bus segment 31 is ready to enter Suspend state (block 66). The USB host 26 may then Globally Suspend the USB bus, or the relevant hub port may Selectively Suspend only the USB bus segment 31 to which the mobile terminal 32 is connected (block 68). The USB bus or bus segment 31 may return to active mode as the result of Resume signaling, which may be initiated by the USB host 26, the mobile terminal 32, or another device on the bus segment 31 (block 70). If the Resume signaling is initiated by the USB host 26 or another USB device, data transfer activity across the USB bus segment 31 will commence as soon as the bus segment 31 completes the Resume signaling protocol. If the mobile terminal 32 initiates the Resume signaling, the bus segment 31 will return to an active state, supplying full power to the mobile terminal 32, however, the mobile terminal 32 will not request a data transfer.

Although described herein with respect to a USB bus-powered mobile terminal 32, the present invention is not limited to this implementation. Any USB bus-powered device may have a predictable need for active state power levels, when there is no need to transfer data across the bus segment 31. As a simple example, an alarm clock function implemented as a USB bus-powered device may tick away and monitor the time in Suspend state, on 2.5 mA. However, the 2.5 mA may be insufficient current to activate the alarm (e.g., a buzzer, flashing light, or the like). Since the alarm clock function knows when the higher power will be required, but it requires no data and has no data to transmit to the system 10, it may initiate Resume signaling sufficiently in advance of the alarm time to return the bus segment 31 to an active state with full power being supplied, without transferring data, as disclosed herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An on-demand method of powering a USB device, comprising:
    supplying a first current to a USB device attached to a USB bus segment in active mode;
    in response to a lack of USB data transfer activity at the USB device, placing the USB bus segment in suspend mode and supplying a second current lower than the first current to the USB device;
    in response to an indication from the USB device, restoring the USB bus segment to active mode and supplying the first current to the USB device;
    wherein the USB bus restore does not prompt a data transfer between a USB host and the USB device.

2. The method of claim 1 wherein the USB device anticipates a need for the second current, and initiates a remote wakeup procedure, without indicating any data transfer operation.

3. The method of claim 2 wherein the USB device comprises a wireless communication system mobile terminal.

4. The method of claim 2 wherein the mobile terminal's anticipated need for the second current is to power a wireless receiver circuit to monitor a paging channel.

5. A USB bus-powered device, comprising:
    an electronic circuit;
    a USB interface receiving from a USB bus segment a first current sufficient to power the electronic circuit in an active mode and a second current insufficient to power the electronic circuit in a suspend mode; and
    a controller operative to anticipate a need to power the electronic circuit, and in response, to issue a remote wakeup procedure to transition the USB bus segment from suspend mode to active mode without transferring data across the USB bus.

6. The device of claim 5 wherein the device comprises a wireless communication system mobile terminal, and wherein the electronic circuit comprises a wireless transceiver operative, when powered, to monitor a paging channel of a wireless communication system.

7. The device of claim 6 wherein the controller periodically anticipates a need to power the transceiver to monitor the paging channel.

8. A data processing system, comprising:
    a processor;
    a USB bus host controlling at least one USB bus segment;
    at least one USB bus-powered device drawing current from the USB bus; and
    a computer readable medium including instructions in the form of a device driver operative to execute on the processor and cause the computer to monitor device activity and selectively direct the USB bus host to suspend the USB bus segment, the device driver further operative to cause the computer to query the USB bus-powered device for power needs prior to suspending the USB bus segment.

9. The system of claim 8 wherein the device driver is further operative to cause the computer to maintain the USB bus segment in an active state if the USB bus-powered device indicates a need for power.

10. The system of claim 9 wherein the device driver is further operative to cause the computer to direct the USB bus host to suspend the USB bus segment only if the USB bus-powered device indicates no need for power.

11. The system of claim 8 wherein the device driver is transferred to the system from the USB bus-powered device when the device is initialized.

12. The system of claim 8 wherein the USB bus-powered device is a wireless communication system mobile terminal.

13. The system of claim 8 wherein the mobile terminal periodically indicates to the device driver a need for power to monitor a paging channel.

14. A computer readable medium including instructions in the form of a USB device driver, the instructions operative to cause a computer to perform the steps of:
    monitoring a USB bus segment for data transfer activity;
    determining, based on a lack of data transfer activity, to suspend the bus segment;
    querying one or more devices attached to the bus segment whether they can enter a low power mode; and
    selectively suspending the bus segment or not, in response to the a device's response to the query.

15. The computer readable medium of claim 14 wherein suspending the bus segment comprises directing a USB host to halt all data transmission on the bus segment and allow attached devices to enter Suspend state.

* * * * *